Feb. 8, 1966 L. I. MAISSEL ETAL 3,234,442
METHOD FOR FABRICATING THIN FILM CIRCUIT
ELEMENTS AND RESULTING ELEMENTS
Filed March 23, 1962 2 Sheets-Sheet 1

INVENTORS
LEON I. MAISSEL
NORMAN W. SILCOX
BY George O. Saile
ATTORNEY 3,234,442

METHOD FOR FABRICATING THIN FILM CIRCUIT ELEMENTS AND RESULTING ELEMENTS

Leon I. Maissel and Norman W. Silcox, Poughkeepsie, N.Y., assignors to International Business Machines Corporation, New York, N.Y., a corporation of New York

Filed Mar. 23, 1962, Ser. No. 182,033
16 Claims. (Cl. 317—258)

This invention relates to low leakage solid state capacitors and a method for making such capacitors. The invention is more particularly directed to the application of counter electrodes to a metal oxide dielectric layer.

A concentrated effort is under way in all segments of the industry to reduce the size and weight of electronic assemblies. One of the approaches is in the thin film area. Passive elements, such as resistors and capacitors, of microminiaturized electronic networks may be formed onto a suitable substrate. Solid state capacitors have been prepared by the electrochemical oxidation of tantalum metal followed by the evaporation of a counter electrode thereon. The nature of the counter electrode metal has proven to be an important parameter in the preparation of reliable low leakage capacitors. Evaporated gold electrodes give low leakage properties while the same procedure for aluminum has not been found satisfactory. The reason for this apparent inconsistency and solution therefor has not been known to the prior art.

It is an object of this invention to provide a solid state circuit element wherein any desired counter electrode may be applied directly over a metal oxide layer.

It is a further object of this invention to provide a solid state low leakage capacitor wherein any desired counter electrode metal may be used.

It is a still further object of this invention to provide a method for preparing the surface of the metal oxide, dielectric layer before applying a shadowing metal counter electrode thereon.

These and other objects are accomplished in accordance with the broad aspects of the present invention by depositing a very thin coating of an insulator material onto the surface of the metal oxide, dielectric layer of the capacitors and depositing a counter electrode thereover. The formation of solid state capacitors includes first depositing a layer of metal by conventional electroplating, cathode sputtering or vacuum evaporation techniques upon a suitable substrate. The next step constitutes oxidizing the metal layer partially through its thickness to produce a dielectric oxide layer. Microfissures are formed in the oxide layer due predominantly to the lattice mismatch between the metal oxide and the metal layers. It has been found that these microfissures in the metal oxide layer can be a major source of leakage depending upon the nature of the counter electrode. Where there is a relatively high mismatch between the metal oxide and metal layers, such as in capacitors formed from tantalum, niobium, titanium and bismuth, the microfissures problem is especially serious. The simple deposit of a counter electrode of a shadowing metal, such as aluminum or tantalum, onto the surface of the metal oxide, dielectric layer will have the effect of the metal filling the microfissures and causing severe current leakage. However, if a shadowing metal is applied to the surface where the counter electrode is intended to be deposited and is thereafter oxidized completely, the microfissures will be filled with the dielectric metal oxide. A counter electrode of any metal shadowing or nonshadowing may be now applied to the metal oxide layer.

Thus, solid state capacitors with low leakage properties may be produced using any desired counter electrode. Electrical capacitors may now be made with electrodes, both the bottom and counter, being composed of a single metal element as, for example, the metal tantalum. Stacking, one on top of another, of these symmetrical capacitors may be readily accomplished by standard depositing and oxidizing procedures.

The foregoing and other objects, features and advantages of the invention will be apparent from the following more particular description of the preferred embodiments of the invention as illustrated in the accompanying drawings.

Figure 1:
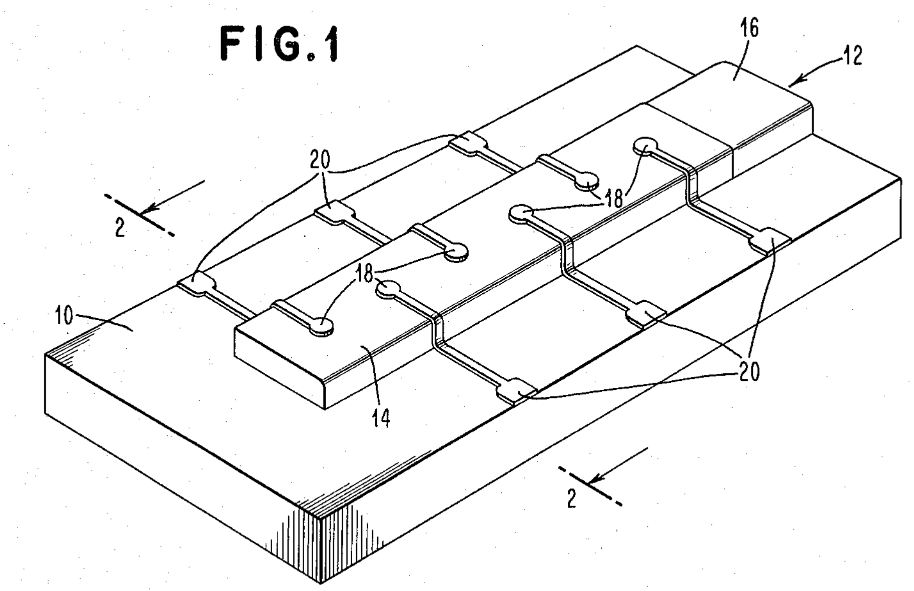
FIGURE 1 is a perspective, greatly enlarged view of a solid state capacitor produced in accordance with the present invention.
Figure 2:
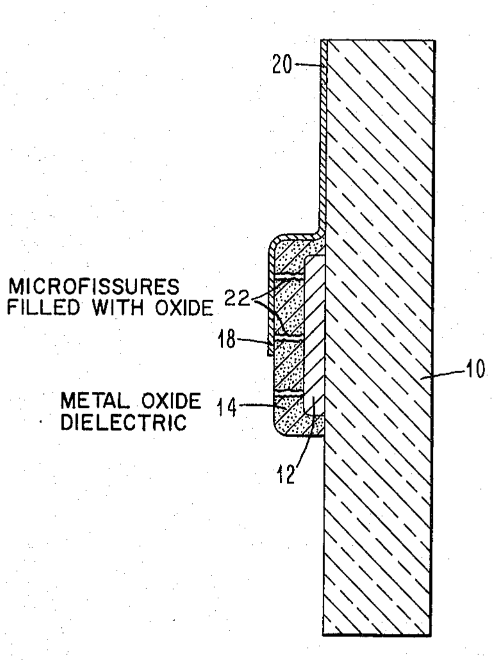
FIGURE 2 is a sectional view taken along lines 2—2 of FIGURE 1 of the solid state capacitor produced in accordance with the present invention.

Referring now, more particularly, to FIGURES 1 and 2, there is illustrated one possible form of the solid state capacitor that the present invention may take. There is shown substrate 10 upon which a metallic layer 12 has been deposited by any of the conventional metal depositing techniques such as cathode sputtering, vacuum evaporation and electroplating. The substrate 10 must have the properties of high electrical insulation, mechanical strength and good mechanical bonding to the metal layer to be applied thereover. Substrates which have these properties include high purity chemical resistance glasses, and certain ceramics.

The metal layer 12 on the glass substrate is then oxidized partially through its thickness to form a dielectric metal oxide layer 14. Oxidation of the metal layer may be conveniently accomplished by the electrochemical anodization technique in an appropriate electrolyte which does not dissolve the metal oxide layer as it is formed. Alternatively, the metal layer could be oxidized in an oxidizing atmosphere where the characteristics of the metal be so adaptable. The bottom electrode contact 16 of the metal layer 12 is left unoxidized by conventional masking techniques. The metal oxide surface, upon which the counter electrodes 18 are to be applied, is prepared by a pretreatment procedure to be more fully explained in the following paragraph. The counter electrodes 18 and the top contacts 20 of the capacitor are then applied onto the prepared metal oxide surface and the glass substrate, respectively, by preferably a vacuum evaporation procedure.

Figure 3:
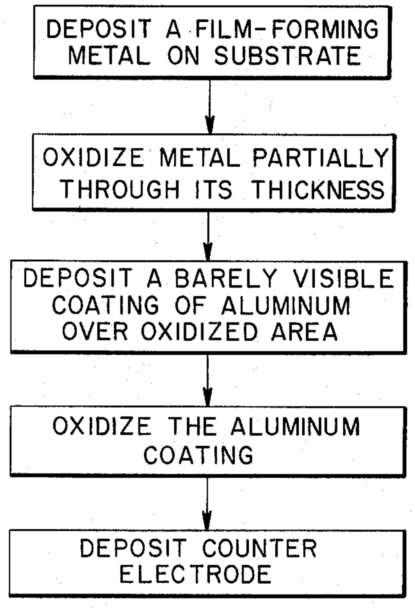
FIGURES 3 and 4 are flow diagrams giving the preferred methods for manufacturing the thin film circuit elements of the present invention.

There are two general procedures for preparing the metal oxide, dielectric layer prior to the application of a shadowing metal counter electrode. The first as illustrated in FIGURE 3 is to fill the microfissures, which are shown in the FIGURE 2 in greatly enlarged form as 22, with a shadowing metal followed by the oxidation of the metal within the microfissures. It is preferred that the shadowing metal be etched away from the surface of the metal oxide, leaving the metal only in the microfissures, before oxidation of the metal is undertaken. Etching of the shadowing metal off the external surface of the metal oxide layer 14 is important to the establishment of exacting capacitor values. The control of capacitor value is difficult if a layer of dielectric shadowing metal oxide is in series with the dielectric metal oxide layer 14. The FIGURE 2 microfissures 22 are shown filled with oxidized shadowing metal and no oxidized shadowing metal on the surface of the metal oxide.

Figure 4:
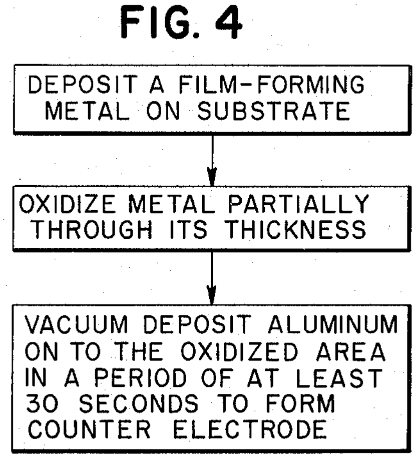

Then the counter electrode may be applied in the usual manner. An alternative procedure as illustrated in FIGURE 4 is to place the metal oxide film within a vacuum evaporating apparatus maintained at a high vacuum and evaporate aluminum as slowly as possible to condense the aluminum vapors upon the metal oxide films. The residual oxygen and water vapor in the vacuum chamber causes the partial oxidation of the aluminum as it condenses upon the metal oxide layer. With the second alternative, the deposited layer of aluminum serves as a counter electrode.

The strain in the films prepared by oxidation is due predominantly to the lattice mismatch between the metal oxide and the metal layers. Microfissures having widths of a fraction of a micron develop in the metal oxide layer from this strained condition and create a leakage problem where the metal oxide has a relatively low tensile strength and there is present a relatively high mismatch between the metal oxide and metal layers. The following Table I:

TABLE I

| | Density | Molecular Weight | Molar Volume | Mismatch Ratio |
|---|---|---|---|---|
| Tantalum (Ta) | 16.6 | 180.9 | 11.4 | 2.2 |
| Tantalum oxide ($Ta_2O_5$) | 8.7 | 441.8 | 50.8 | |
| Niobium (Nb) | 8.6 | 92.9 | 10.8 | 2.55 |
| Niobium oxide ($Nb_2O_5$) | 4.8 | 265.8 | 55.3 | |
| Bismuth (Bi) | 9.8 | 209.0 | 21.2 | 2.0 |
| Bismuth oxide ($Bi_2O_3$) | 5.6 | 466.0 | 83.2 | |
| Titanium (Ti) | 4.5 | 47.9 | 10.6 | 1.8 |
| Titanium oxide ($TiO_2$) | 4.26 | 79.9 | 18.8 | |
| Aluminum (Al) | 2.7 | 27.0 | 10.0 | 1.25 |
| Aluminum oxide ($Al^2O_3$) | 4.0 | 102.0 | 25.5 | |

compares four metals; tantalum, niobium, titanium and bismuth, which exhibit the formation of microfissures in their respective oxide layers due to the high mismatch ratio between the metal and metal oxide layers to aluminum. Aluminum is given as illustrative of a relatively low mismatch metal-to-metal oxide element and does not have excessive microfissures within its metal oxide layer.

Metals that can be used as the counter electrode of a solid state capacitor may be classified, in general, in one of two categories, shadowing and nonshadowing metals. Shadowing metals are those which will tend to fill the microfissures in a metal oxide film when applied thereto as a counter electrode. The nonshadowing metals will not fill the microfissures.

A series of experiments were accomplished using the following basic procedure to determine the factors effecting gross leakage current in solid state capacitors. A high purity, chemical resistant glass microscope slide was thoroughly cleaned, rinsed in distilled water and dried. The slide was placed in a cathode sputtering apparatus and a layer of tantalum metal approximately 4,000 angstroms thick was condensed thereon. The sputtered tantalum layer was then anodized partially through its thickness in an electrolyte consisting of a freshly prepared 1 by weight aqueous solution of ammonium borate. The electrolyte was maintained at approximately room temperature during the anodization period. The tantalum layer was made the anode of the cell, the voltage across the growing oxide was raised to and maintained at 100 volts and anodization continued for at least 20 minutes. A layer of tantalum oxide approximately 1,600 angstroms thick was thereby formed over the surface of the metal layer except for a portion of the metal layer designated as the bottom contact. The experiments included the application of counter electrodes of gold, tin, zinc and aluminum of the order of 1,000 angstroms in thickness by vacuum evaporation over tantalum oxide layer. Further, solid state capacitors were formed using the novel metal oxide pretreatment technique and the detailed procedures are disclosed below as Examples 1 through 4. The summary of results are listed as the following Table II:

TABLE II

| Counter Electrode Metal | Leakage Current (a.) 5 volts D.C. positive | Percent Forming Voltage(+) | Capacitor Formed |
|---|---|---|---|
| Gold | $10^{-9}$ | 80-90 | Excellent. |
| Tin | $10^{-9}$ | 40-50 | Good. |
| Zinc | $10^{-9}$ | 40-50 | Do. |
| Aluminum | $10^{-3}$ | 0 | Unsatisfactory. |
| Aluminum-Surface prepared as given in Example 1. | $10^{-9}$ | 40-50 | Good. |
| Aluminum-Surface prepared as given in Example 2. | $10^{-3}$ | 0 | Unsatisfactory. |
| Tantalum (sputtered)-Surface prepared as given in Example 3. | $10^{-9}$ | 70-80 | Excellent. |
| Aluminum (slow evaporation) Example 4. | $10^{-9}$ | 30-40 | Good. |

The leakage current from the solid state capacitors listed in the above Table II was determined by the following procedure: five volts of D.C. positive is first applied and, if the current is in the millimicroamp range, the capacitance and dissipation are measured. The capacitors are then placed under a D.C. bias, both positive and negative, until a current of $10^{-3}$ amp/cm.$^2$ can be measured. At this point, the capacitor is defined as having broken down and no further bias is applied. The maximum bias voltage attained is given in Table II as the percent of the forming voltage (100 volts), percent V(+), before a leakage current of $10^{-3}$ amps/cm.$^2$ is recorded.

The capacitors having evaporated gold, tin and zinc counter electrodes proved to be satisfactory capacitors having low leakage properties as shown in the above Table II. The capacitors having the aluminum counter electrodes had high leakage currents and, therefore, are unsatisfactory as capacitors. It is postulated then that the gold, tin and zinc metals are nonshadowing metals and do not fill the microfissures in the tantalum oxide layer. Aluminum is a shadowing metal and fills the microfissures in the tantalum oxide layer and thereby causes leakage in the formed capacitor.

The invention is further illustrated by the following detailed procedure using the metal tantalum as an example:

*Example 1*

As stated in the general procedure above, a substrate composed of an inert glass microscope slide having a layer of tantalum approximately 4,000 angstrom units in thickness which have been partially anodized to produce a surface layer of approximately 1,600 angstrom units of tantalum oxide was utilized. Aluminum was then rapidly evaporated in a standard vacuum evaporating chamber onto the surface of the tantalum oxide layer where counter electrodes are to be applied. The thickness of the coating was kept to a bare minimum. The aluminum coated element was then taken from the vacuum chamber and etched in aqueous potassium hydroxide for about 15 seconds until the aluminum appeared to be removed from the surface. A very small amount of potassium hydroxide was used so that the solution becomes quickly saturated with the aluminum. The tantalum oxide layer having aluminum in the layer's microfissures was anodized in a 1% by weight aqueous solution of boric acid. Anodizaton was effected in the usual manner at room temperature with the maximum forming voltage at 125 volts.

A large number of small capacitors were made from the element by evaporating aluminum through an appropriate mask onto the surface of the tantalum oxide dielectric layer to produce a large number of counter electrodes of the order of 1,000 angstroms in thickness. Leakage currents were obtained for the capacitors and the average current was less than $10^{-9}$ amps at the 5-volt D.C. bias level. The leakage current did not reach $10^{-3}$ amps before a bias voltage was applied which was 40 to 50% of the forming voltage.

*Example 2*

The procedure of Example 1 was repeated except that anodization of the tantalum oxide layer having aluminum in the layer's microfissures was done using an electrolyte of 0.5% by weight aqueous solution of sodium hydroxide. Capacitors were formed by evaporating aluminum counter electrodes on the dielectric layer. The leakage current was excessive at 5 volts bias. The apparent reason for this being that the electrolyte dissolved the aluminum oxide from the microfissures substantially when it was formed.

*Example 3*

The procedure of Example 1 was repeated except that after anodizing of the tantalum oxide layer having aluminum oxide in its fissures there was applied a large number of counter electrodes of tantalum by the cathode sputtering technique through an appropriate mask. Leakage currents were determined for the capacitors made and the average current was less than $10^{-9}$ amps at the 5-volt D.C. bias level. Upon raising the bias voltage it was not until 70 to 80% of the former voltage before the leakage current reached $10^{-3}$ amps.

*Example 4*

An inert glass slide having a tantalum layer which has been partially anodized according to the general procedure listed above was placed in a vacuum evaporation chamber. The vacuum chamber was evacuated to $10^{-4}$ to $10^{-5}$ millimeters of mercury. Counter electrodes were applied to the tantalum oxide, dielectric layer through an appropriate mask by slowly evaporating aluminum onto the tantalum oxide surface. The slow evaporation of the aluminum was controlled by applying current to the heating coil gradually. The time for evaporation was approximately two minutes rater than the normal rapid evaporation time of less than 15 seconds. The deposit was milky in appearance rather than the usual bright aluminum color. Leakage currents were obtained for the capacitors and the average current was less than $10^{-9}$ amps at the 5-volt D.C. bias level. The leakage current did not reach $10^{-3}$ amps before a bias voltage was applied which was 40 to 50% of the forming voltage.

The invention thus provides a procedure for making solid state capacitors which have low leakage currents without being limited as to choice of counter electrode metal. For example, the long sought after symmetrical solid state capacitor composed of tantalum oxide, dielectric layer and tantalum bottom and counter electrodes is now a reality. The fabricators of microminiaturized electric networks now have a greater freedom to choose their metals when designing "printed" thin film circuits.

The method taught in this invention is applicable to making solid state circuit elements in general and solid state capacitors in particular from the class of metals which develop microfissures in their metal oxide films prepared by oxidation due to a high lattice mismatch between the metal oxide and the metal layers. The detailed examples given are not intended to limit the invention to the particular materials used. The anodization, for example, of the shadowing metal within the microfissures of the metal oxide layer may be accomplished using any standard electrolyte which will not attack the oxide as formed. Further, the thicknesses of the deposited metal layers and the dielectric metal oxide layer produced thereon may be varied to give a range of possible capacitances.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. A method for applying a counter electrode of a shadowing metal directly to a metal oxide film comprising:
- positioning a metal oxide film containing microfissures therein extending through said film and having widths of a fraction of a micron in a vacuum evaporating apparatus;
- evacuating the vacuum chamber of said apparatus;
- and evaporating aluminum and condensing the aluminum vapors upon said metal oxide film to form a counter electrode thereon in a period of at least thirty seconds whereby the residual oxygen and water vapor in said chamber causes the partial oxidation of said aluminum as it condenses upon said metal oxide film.

2. A method for manufacturing a thin film capacitor comprising:
- applying a thin film of a metal upon a suitable insulating subtrate;
- oxidizing said metal partially through its thickness to form a dielectric metal oxide layer; said metal oxide layer containing microfisures therein extending through said layer and having widths of a fraction of a micron;
- and evaporating aluminum onto said metal oxide layer to form a counter electrode thereon in an evacuated chamber in a period of at least thirty seconds which causes the formation of a milky-appearing aluminum coating on said metal oxide film.

3. A method for applying a counter electrode of a shadowing metal directly to a tantalum oxide film to form a thin film capacitor comprising:
- positioning a tantalum oxide film containing microfissures therein extending through said film and having widths of a fraction of a micron in a vacuum evaporating apparatus;
- evacuating the vacuum chamber of said apparatus to a vacuum of the order of $10^{-4}$ millimeters of mercury;
- and evaporating aluminum and condensing the aluminum vapors upon said tantalum oxide film to form a counter electrode thereon in a period of at least thirty seconds whereby the residual oxygen and water vapor in said chamber causes the partial oxidation of said aluminum as it condenses upon said tantalum oxide film.

4. A method for manufacturing a solid state circuit element comprising:
- vacuum depositing a film-forming metal upon a suitable insulating substrate;
- said metal having the characteristic that when its surface is oxidized there is a lattice mismatch between the oxide and the metal layers which mismatch results in the formation of microfissures in the oxide layer which extend through said layer and having widths of a fraction of a micron;
- oxidizing said metal partially through its thickness to form a metal oxide layer wherein microfissures are present;
- filling the microfissures of said metal oxide film with a shadowing metal oxide material;
- and depositing a counter electrode onto said surface.

5. A method for manufacturing a thin film capacitor comprising:
vacuum depositing a film of metal upon a suitable substrate;
oxidizing said metal partially through its thickness to form a dielectric metal oxide layer; said metal oxide layer containing microfissures extending through said layer and having widths of a fraction of a micron;
vacuum depositing a barely visible coating of a shadowing metal onto said metal oxide layer whereby the microfissures are filled with said shadowing metal;
oxidizing said shadowing metal;
and depositing at least one counter electrode directly over the metal oxide dielectric layer.

6. A method for manufacturing a thin film capacitor comprising:
depositing a film of tantalum upon a suitable insulating substrate;
anodizing said tantalum partially through its thickness to form a dielectric tantalum oxide layer;
depositing a barely visible coating of aluminum onto said tantalum oxide film;
oxidizing said aluminum coating; and depositing a counter electrode thereover.

7. A thin film circuit element comprising:
a substrate having adherently fixed thereon a bottom electrode layer of a metal;
a layer of an oxide of said metal over said metal layer;
said metal oxide having a relatively low tensile strength and there is present a relatively high mismatch between said oxide and metal layers thereby causing the presence of microfissures extending through the oxide layer and having widths of a fraction of a micron;
at least one counter electrode deposited over said metal oxide layer;
and a shadowing metal oxide insulator material substantially filling the said microfissures extending through the said metal oxide layer adjacent to said counter electrode;
said bottom electrode, metal oxide and counter electrode layers having a cumulative thickness in the order of thousands of angstrom units.

8. A thin film capacitor comprising:
a substrate having adherently fixed thereon a vacuum deposited bottom electrode layer of a metal;
a dielectric layer of an oxide of said metal over said metal layer;
said metal oxide having a relatively low tensile strength and there is present a relatively high mismatch between said oxide and metal layers thereby causing the presence of microfissures having widths of a fraction of a micron in the said oxide layer;
at least one counter electrode deposited over said metal oxide layer;
and aluminum oxide substantially filling the microfissures extending through the said oxide layer adjacent to said counter electrode;
said bottom electrode, metal oxide and counter electrode layers having a cumulative thickness in the order of thousands of angstrom units.

9. A thin film capacitor comprising:
a substrate having adherently fixed thereon a bottom electrode layer of tantalum;
a dielectric layer of tantalum oxide over said tantalum layer;
said tantalum oxide layer containing microfissures therein extending through the width of the tantalum oxide layer;
at least one tantalum counter electrode over said tantalum oxide layer;
and aluminum oxide substantially filling the microfissures extending through the said tantalum oxide layer;
said bottom electrode, tantalum oxide and counter electrode layers having a cumulative thickness in the order of thousands of angstrom units.

10. A method for applying a counter electrode of a shadowing metal directly to a metal oxide film containing microfissures having widths of a fraction of a micron:
positioning a metal oxide film containing microfissures in a vacuum exaporating apparatus;
evacuating the vacuum chamber of said apparatus to a vacuum of the order of $10^{-4}$ millimeters of mercury;
and evaporating aluminum and condensing the aluminum vapors upon said metal oxide film to form the counter electrode thereon in a period of at least thirty seconds whereby the residual oxygen and water vapor in said chamber cause the partial oxidation of the aluminum as it condenses and fills the microfissures of said metal oxide film.

11. A method for manufacturing a thin film capacitor comprising:
depositing a film-forming metal upon a suitable insulating substrate;
said metal having the characteristic that when its surface is oxidized there is a high lattice mismatch between the oxide and the metal layers which mismatch results in the formation of microfissures in the oxide layer;
oxidizing said metal layer partially through its thickness to form a dielectric metal oxide layer wherein microfissures are present;
positioning said metal film having said metal oxide layer in a vacuum evaporating apparatus;
evacuating the vacuum chamber of said apparatus to a vacuum of the order of $10^{-4}$ millimeters of mercury;
and evaporating aluminum and condensing the aluminum vapors upon said metal oxide film to form the counter electrode thereon in a period of at least thirty seconds whereby the residual oxygen and water vapor in said chamber cause the partial oxidation of the aluminum as it condenses and fills the microfissures of said metal oxide film.

12. A method for applying a counter electrode of a shadowing metal directly to a microfissure-containing metal oxide layer of a film which consists of a metal layer and a metal oxide layer on a suitable substrate comprising:
depositing a coating of a shadowing metal onto a microfissure containing metal oxide layer;
etching the said shadowing metal off the external surfaces of the said metal oxide layer whereby the said shadowing metal remains only in said microfissures;
oxidizing said shadowing metal in said microfissures;
and directly depositing said counter electrode over the microfissure-filled metal oxide layer.

13. A method for manufacturing a solid state circuit element comprising:
depositing a film-forming metal selected from the group consisting of bismuth, niobium, tantalum and titanium upon a suitable insulating substrate;
oxidizing said metal partially through its thickness to form a metal oxide layer;
depositing a barely visible coating of aluminum onto the said metal oxide layer;
oxidizing said aluminum coating;
and depositing a counter electrode thereover.

14. A method for manufacturing a thin film capacitor comprising:
depositing a film of metal upon a suitable substrate;
said metal having the characteristic that when its surface is oxidized there is a lattice mismatch between the oxide and the metal layers which mismatch results in the formation of microfissures in the oxide layer;

oxidizing said metal partially through its thickness to form a dielectric metal oxide layer wherein microfissures are present;

depositing a coating of a shadowing metal onto said metal oxide layer sufficient in thickness to at least substantially fill said microfissures;

etching the said shadowing metal off the external surfaces of the said metal oxide layer whereby the said shadowing metal remains only in said microfissures;

oxidizing said shadowing metal in said microfissures; and depositing at least one counter electrode over the microfissure-filled metal oxide layer.

15. The circuit element of claim 7 wherein said metal is titanium.

16. The thin film capacitor of claim 8 wherein said metal is selected from the group consisting of bismuth, niobium, tantalum and titanium.

References Cited by the Examiner

UNITED STATES PATENTS

| | | | |
|---|---|---|---|
| 1,906,691 | 5/1933 | Lilenfeld | 317—258 |
| 2,497,066 | 2/1950 | Brennan | 317—258 |
| 2,734,478 | 2/1956 | Reynolds | 317—258 X |
| 2,822,301 | 2/1958 | Alexander et al. | 117—217 |
| 2,899,345 | 8/1959 | Oshry | 317—258 X |
| 2,993,266 | 7/1961 | Berry | 29—25.42 |
| 3,066,247 | 11/1962 | Robinson | 317—258 |
| 3,093,883 | 6/1963 | Haring | 29—25.42 |

OTHER REFERENCES

Berry and Sloan: "Tantalum Printed Capacitors," in Proceedings of the IRE, June 1959, pp. 1070–1075.

JOHN F. BURNS, *Primary Examiner.*